United States Patent
Boyapati et al.

(10) Patent No.: US 11,785,102 B1
(45) Date of Patent: Oct. 10, 2023

(54) METHODS, SYSTEMS, AND COMPUTER READABLE MEDIA FOR APPLICATION PROGRAMMING INTERFACE (API) RELATED GROUPINGS INVOLVING COMMON APPLICATION PROGRAMMING INTERFACE FRAMEWORK

(71) Applicant: Oracle International Corporation, Redwood Shores, CA (US)

(72) Inventors: Kiranmayi Boyapati, Bangalore (IN); Sukawanth Padmanabhan, Coimbatore (IN); Ashok Kumar Karyampudi, Bangalore (IN)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 0 days.

(21) Appl. No.: 17/828,746

(22) Filed: May 31, 2022

(51) Int. Cl.
*H04L 67/51* (2022.01)
*H04W 48/18* (2009.01)
*H04L 67/133* (2022.01)

(52) U.S. Cl.
CPC ............ *H04L 67/51* (2022.05); *H04L 67/133* (2022.05); *H04W 48/18* (2013.01)

(58) Field of Classification Search
CPC ....... H04L 67/51; H04L 67/133; H04W 48/18
USPC ......................................................... 709/203
See application file for complete search history.

(56) References Cited

U.S. PATENT DOCUMENTS

2021/0344774 A1* 11/2021 Ge .......................... H04L 67/60
2023/0027164 A1* 1/2023 Xu ....................... H04L 41/0686

FOREIGN PATENT DOCUMENTS

WO WO-2021176131 A1 * 9/2021

OTHER PUBLICATIONS

"3rd Generation Partnership Project; Technical Specification Group Core Network and Terminals; Security aspects of Common API Framework (CapIF) for 3GPP Northbound APIs; (Release 15)", 3GPP TS 33.122, V15.1.0, pp. 1-30 (Oct. 2018).

"3rd Generation Partnership Project; Technical Specification Group Services and System Aspects; Functional architecture and information flows to support Common API Framework for 3GPP Northbound APIs; Stage 2 (Release 16)", 3GPP TS 23.222, V16.10.0, pp. 1-118 (Jun. 2021).

(Continued)

*Primary Examiner* — Wing F Chan
*Assistant Examiner* — Leon Y Tseng
(74) *Attorney, Agent, or Firm* — Jenkins, Taylor & Hunt, P.A.

(57) ABSTRACT

Methods, systems, and computer readable media for application programming interface (API) related groupings involving common API framework (CAPIF) are disclosed. One example method for using an API exposure function (AEF) group comprises: at a CAPIF node including at least one processor: receiving an AEF group creation message for creating an AEF group associated with an API invoker, wherein the AEF group creation message includes AEF group information indicating one or more service APIs usable by an API invoker; storing the AEF group information; determining, using the AEF group information, service API information associated with the AEF group for the API invoker; and providing the service API information to the API invoker.

20 Claims, 11 Drawing Sheets

(56) References Cited

OTHER PUBLICATIONS

"3rd Generation Partnership Project; Technical Specification Group Core Network and Terminals; Common API Framework for 3GPP Northbound APIs; (Release 16)", 3GPP TS 29.222, V16.7.0, pp. 1-149 (Jun. 2021).

"3rd Generation Partnership Project; Technical Specification Group Core Network and Terminals; 5G System; Network Function Repository Services; Stage 3 (Release 16)", 3GPP TS 29.510, V16.9.0, pp. 1-99 (Sep. 2021).

"3rd Generation Partnership Project; Technical Specification Group Core Network and Terminals; 5G System; Network Exposure Function Northbound APIs; Stage 3 (Release 16)", 3GPP TS 29.522, V16.9.0, pp. 1-185 (Sep. 2021).

"3rd Generation Partnership Project; Technical Specification Group Core Network and Terminals; T8 reference point for Northbound APIs; (Release 16)", 3GPP TS 29.122, V16.11.0, pp. 1-408 (Sep. 2021).

"3rd Generation Partnership Project; Technical Specification Group Core Network and Terminals; 5G System; Technical Realization of Service Based Architecture; Stage 3 (Release 16)", 3GPP TS 29.500, V16.9.0, pp. 1-99 (Sep. 2021).

\* cited by examiner

400

| FIELD NAME | DATA TYPE | MANDATORY(M)/ OPTIONAL(O) STATUS | DESCRIPTION |
|---|---|---|---|
| aefgroupId | string | M | THE GROUP NAME OR IDENTIFIER |
| apiProviderInfo | List<Provider info> | M | LIST OF PROVIDER DOMAINS |
| apiProviderInfo.aefIds | List<AefId> | M | LIST OF AEFS UNDER EACH PROVIDER |
| apiProviderInfo.aefIds.apis | List<apis> | M | LIST OF APIS UNDER EACH AEF |

FIG. 4

| FIELD NAME | DATA TYPE | MANDATORY(M)/ OPTIONAL(O) STATUS | DESCRIPTION |
|---|---|---|---|
| aefgroupId | string | M | THE GROUP NAME OR IDENTIFIER |
| apiProviderInfo | List<Provider info> | M | LIST OF PROVIDER DOMAINS (TO BE UPDATED) |
| apiProviderInfo.aefIds | List<AefId> | O | LIST OF AEFS UNDER EACH PROVIDER (EMPTY MEANS DELETE API PROVIDER INFO FROM GROUP) |
| apiProviderInfo.aefIds. apis | List<apis> | O | LIST OF APIS UNDER EACH AEF (EMPTY MEANS DELETE THE AEF) |

| GROUP ID | GROUP DATA (JSON) |
|---|---|
| group_001 | {<br>"groupId":"group001",<br>"apiProviderInfos":[<br>  {<br>  "apiProviderId":"provider-001",<br>  "aefIds":[<br>    {"aefId":"aef-001",<br>    "api":[<br>      "nidd",<br>      "monitoring"<br>    ]}]}]} |
| group_002 | {<br>"groupId":"group002",<br>"apiProviderInfos":[<br>  {<br>  "apiProviderId":"provider-002",<br>  "aefIds":[<br>    {"aefId":"aef-002",<br>    "api":[<br>      "nidd",<br>      "monitoring"]},<br>    {"aefId":"aef-003",<br>    "api":[<br>      "monitoring"]}<br>  ]}]} |

FIG. 9

| INVOKER PPR ID | GROUP ID | AUTO-ONBOARD STATUS | START TIME | STOP TIME |
|---|---|---|---|---|
| 1 | group_001 | true | | |
| 2 | group_002 | true | 12/23/2023 02:35:00 | 12/23/2023 13:35.00 |

METHODS, SYSTEMS, AND COMPUTER READABLE MEDIA FOR APPLICATION PROGRAMMING INTERFACE (API) RELATED GROUPINGS INVOLVING COMMON APPLICATION PROGRAMMING INTERFACE FRAMEWORK

TECHNICAL FIELD

The subject matter described herein relates to improving communications in fifth generation (5G) and other communications networks. More particularly, the subject matter described herein relates to methods, systems, and computer readable media for application programming interface (API) related groupings involving common API framework (CAPIF).

BACKGROUND

In telecommunications networks, a service endpoint is an address on a network node that uniquely identifies an entity that provides service to consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. An NF can be both a producer NF and a consumer NF depending on whether it is consuming or providing service.

A given producer NF may have many service endpoints. Producer NFs register with an NF repository function (NRF). The NRF maintains NF profiles (e.g., data types or data structures for storing information about NF instances) of available NF instances and their supported services. Consumer NFs can subscribe to receive information about producer NF instances that have registered with the NRF. Once registered, NF instances in the 5G network may establish sessions with one or more network exposure functions (NEFs). Notably, the NEF is a 3GPP network function that provides a means to securely expose the services and capabilities provided by producer network functions servicing the network.

SUMMARY

Methods, systems, and computer readable media for application programming interface (API) related groupings (e.g., API exposure function (AEF) groups) involving common API framework (CAPIF) are disclosed. One example method for using an AEF group includes: at a CAPIF node including at least one processor: receiving an AEF group creation message for creating an AEF group associated with an API invoker, wherein the AEF group creation message includes AEF group information indicating one or more service APIs usable by an API invoker; storing the AEF group information; determining, using the AEF group information, service API information associated with the AEF group for the API invoker; and providing the service API information to the API invoker.

One example system for using an AEF group includes at least one processor, a memory, and a CAPIF node including the at least one processor and the memory. The CAPIF node is configured for: receiving an AEF group creation message for creating an AEF group associated with an API invoker, wherein the AEF group creation message includes AEF group information indicating one or more service APIs usable by an API invoker; storing the AEF group information; determining, using the AEF group information, service API information associated with the AEF group for the API invoker; and providing the service API information to the API invoker.

One example non-transitory computer readable medium comprising computer executable instructions embodied in the non-transitory computer readable medium that when executed by at least one processor of at least one computer cause the at least one computer to perform steps comprising: at a CAPIF node including at least one processor: receiving an AEF group creation message for creating an AEF group associated with an API invoker, wherein the AEF group creation message includes AEF group information indicating one or more service APIs usable by an API invoker; storing the AEF group information; determining, using the AEF group information, service API information associated with the AEF group for the API invoker; and providing the service API information to the API invoker.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 4 depicts example information for creating an AEF group;

FIG. 5 depicts example information for updating an AEF group;

FIG. 9 depicts example AEF group information;

FIG. 10 depicts example pre-provisioning rule information; and

DETAILED DESCRIPTION

Figure 1:
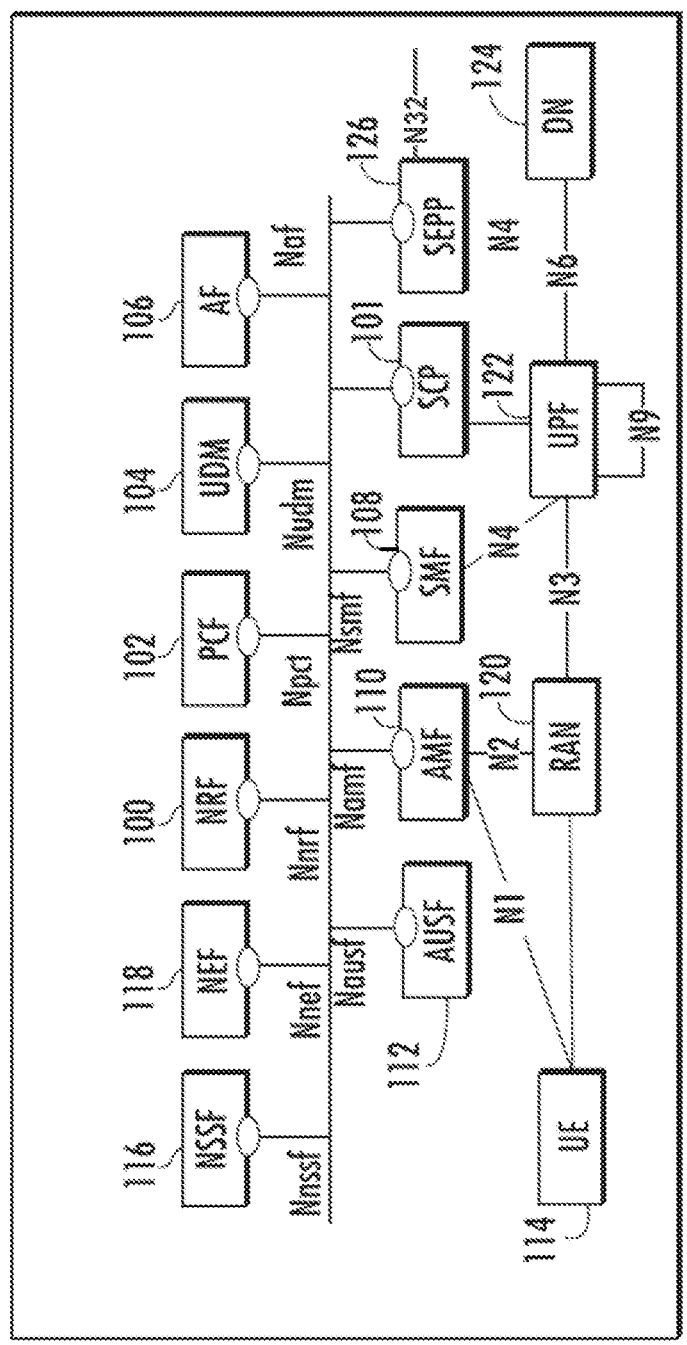
FIG. 1 is a network diagram illustrating an example fifth generation (5G) network architecture.

The subject matter described herein relates to methods, systems, and computer readable media for application programming interface (API) related groupings involving common API framework (CAPIF). The 3rd Generation Partnership Project (3GPP) defines a CAPIF for 3GPP northbound APIs in 3GPP technical specification (TS) 23.222. While 3GPP TS 23.222 defines various CAPIF operations, 3GPP TS 23.222 fails to define procedures for securing exposed APIs in a CAPIF operator's network during API discovery by an API invoker. Further, as defined in 3GPP TS 23.222, a CAPIF operator does not have scope (e.g., mechanisms) to restrict an API invoker's access to certain API provider information and related API exposure function (AEF) information. Also, as defined in 3GPP TS 23.222, when automatically on-boarding an API Invoker, CAPIF does not provide a security mechanism for restricting access of certain published APIs exposed by AEFs and the API for service API discovery supported by CAPIF does not have a provision or mechanism to restrict access to certain service APIs.

In accordance with some aspects of the subject matter described herein, methods, systems, mechanisms, and/or techniques are provided for supporting AEF groups or related usage. For example, a CAPIF node (e.g., a device implementing a core CAPIF function (CCF) or other functionality) in accordance with various aspects described herein may be configured for: receiving an API exposure function (AEF) group creation message for creating an AEF group (e.g., a logical entity for associating one or more API invokers and one or more API providers, AEFs, and/or service APIs) associated with an API invoker, wherein the AEF group creation message includes AEF group information indicating one or more service APIs usable by an API invoker and storing the AEF group information. In this example, the CAPIF node may use the AEF group information to determine what service APIs to provide to the API invoker, e.g., in response to an API invoker onboarding procedure or in response to an API discovery procedure initiated by the API invoker.

In accordance with some aspects of the subject matter described herein, methods, systems, mechanisms, and/or techniques are provided for using AEF groups or related information in supporting or enforcing performance metrics (e.g., service level agreement (SLA) metrics, such as rate limits, speeds, bandwidth, invoker usage, etc.) associated with API invokers or related service APIs. For example, a CAPIF node or a related administrator in accordance with various aspects described herein may associate SLA metrics and an AEF group. In this example, a CAPIF node or related entities may be configured to enforce or attempt to enforce the SLA metrics at the API invoker level (e.g., different API invokers associated with different AEF groups may have different rate limits when using the same service API).

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture, e.g., a home 5G core (5GC) network. The architecture in FIG. 1 includes a network function (NF) repository function (NRF) 100 and a service communication proxy (SCP) 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP TS 29.510. The NF or service profile definition includes at least one of a fully qualified domain name (FQDN), an IP version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMMF) 110 and PCF 102. AMMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs 126 usable for forwarding various communications (e.g., 5GC requests) between a consumer NF and a producer NF after applying application level security protection.

It will be appreciated that FIG. 1 is for illustrative purposes and that various nodes and/or modules, locations, and/or functionality described above in relation to FIG. 1 may be changed, altered, added, or removed.

Figure 2:
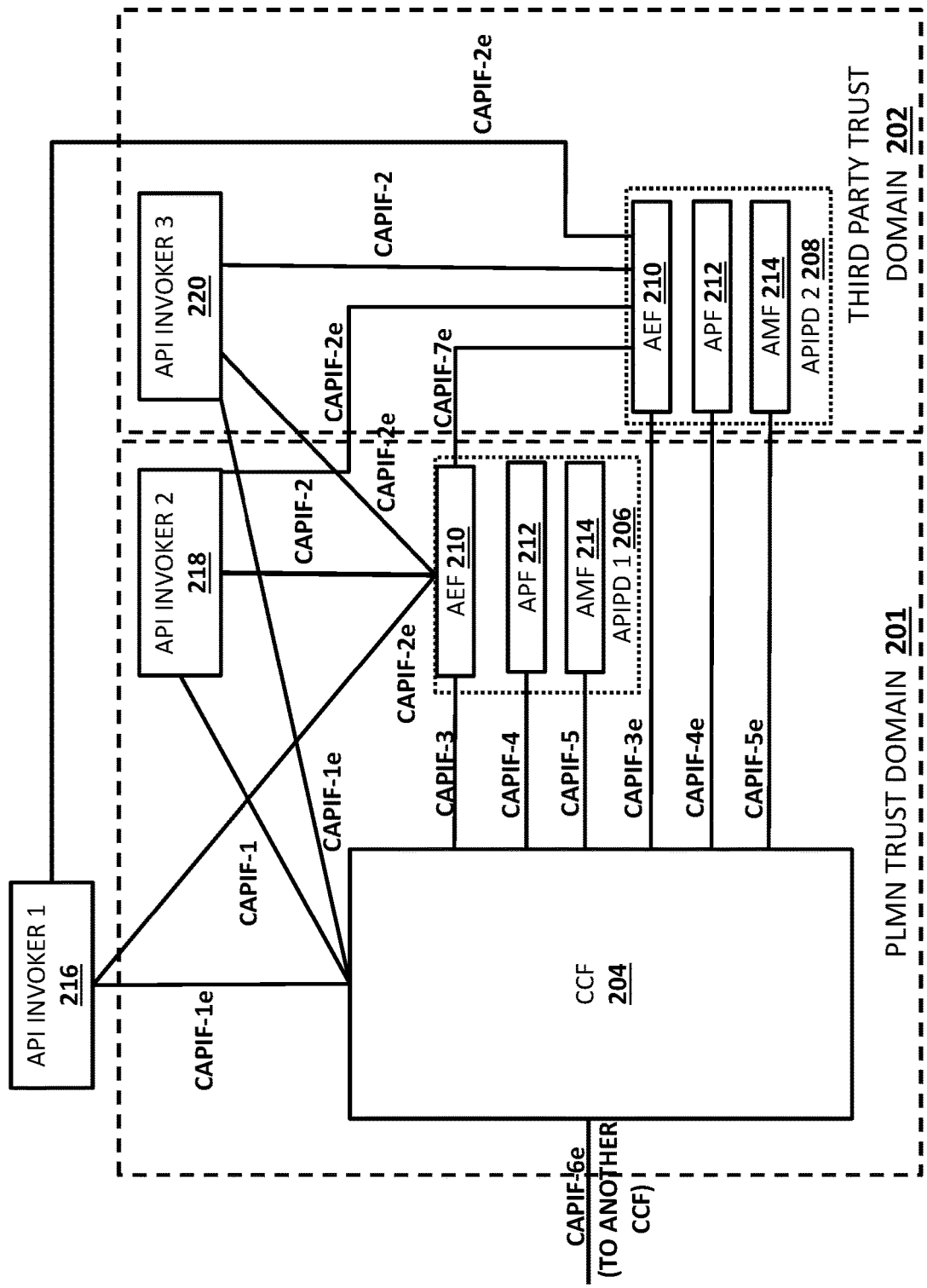
FIG. 2 is a block diagram illustrating an example common application programming interface (API) framework (CAPIF) architecture.

FIG. 2 is a block diagram illustrating an example CAPIF architecture 200 based on the functional model of CAPIF defined in 3GPP TS 23.222. CAPIF architecture 200 may be arranged into various functional entities for enabling access and invocation of service APIs. CAPIF architecture 200 may include a public land mobile network (PLMN) trust domain 201, a third party trust domain 202, a CCF 204, API provider domains (APIPDs) 206-208, and API invokers 216-218.

PLMN trust domain 201 may represent a domain that a local system or network trusts to authenticate users or other entities and a third party trust domain 202 may represent a different trust domain that a third party trusts to authenticates users or other entities. In some embodiments, entities that are trusted by one trust domain (e.g., trust domain 201) may communicate with entities of another trust domain (e.g., trust domain 202), but may use different interfaces or versions thereof, when the entity is external to a particular trust domain. For example, API invoker 216 may communicate with CCF 204 via CAPIF-1e while API invoker 218 may communicate with CCF via CAPIF-1.

CCF 204 may represent a repository for service APIs, including PLMN and third party service APIs. CCF 204 can allow API invokers 216-218 and AEFs 210 to discover service APIs, authenticate and authorize API invokers 216-218 for usage of the service APIs, and perform logging and charging associated with related service API invocations.

Each of APIPDs 206-208 may represent a physical or logical entity (e.g., an API provider) in a trust domain and may include various CAPIF related functions for providing service APIs or related operations. Each of APIPDs 206-208 may include an AEF 210, an API publishing function (APF) 212, and an API management function (AMF) 214. AEF 210 may provide secured access to exposed services (e.g., service APIs) and may act as an entry point into CAPIF service functionality. In some embodiments, AEF 210 may validate the authorization of API invokers 216-218 to use services, provide the services to API invokers 216-218, log related service invocations on CCF 204, and request charging for the services. APF 212 may provide capability to publish and unpublish services (e.g., service APIs) via CCF 204. AMF 214 may provide capability to perform management functions like auditing logs, checking service availability, etc. In some embodiments, AMF 214 may register its respective APIPD (e.g., APIPD 206 or 208) with CCF 204 in its respective trust domain (e.g., trust domain 201 or trust domain 202).

Each of API invokers 216-220 may represent an entity that uses or invokes a service or a related service API. For example, each of API invokers 216-220 may be an AF or other entity, such as an application or client requiring service from an API provider (e.g., APIPD 206 or 208). Each of API invokers 216-220 may discover service APIs from CCF 204, request authorization for service invocations, and use the services provided by AEF 210. API invokers 216-220 may onboard (e.g., register) with CCF 204 and discover various service APIs. API invokers 216-220 may also subscribe with CCF 204 for changes in availability of specific APIs.

It will be appreciated that FIG. 2 is for illustrative purposes and that various nodes and/or modules, locations, and/or functionality described above in relation to FIG. 2 may be changed, altered, added, or removed.

Figure 3:
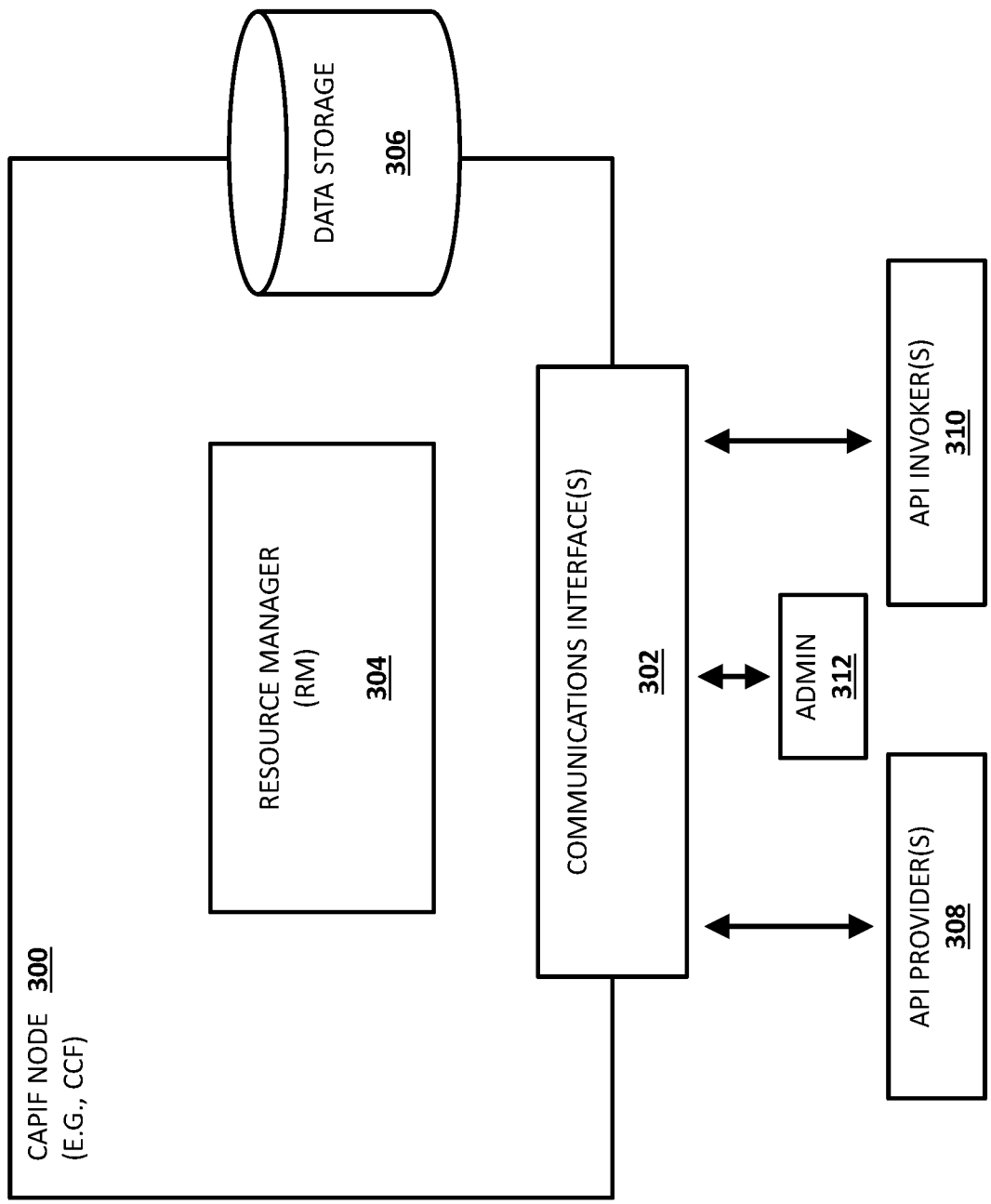
FIG. 3 is a block diagram illustrating an example CAPIF node for supporting API exposure function (AEF) groups and related operations.

FIG. 3 is a block diagram illustrating an example CAPIF node 300 for supporting AEF groups and related operations. CAPIF node 300 may represent any suitable entity or entities (e.g., one or more node(s), device(s), or computing platform(s)) for performing various aspects or functionalities described herein, e.g., supporting AEF groups (e.g., a logical entity for indicating authorized service APIs and attributes (e.g., rate limits or other SLA metrics) associated with particular API invoker(s) 310) and related operations, e.g., storing and using AEF group information to determine authorized or allowed service APIs for particular API invoker(s) 310. In some embodiments, CAPIF node 300 may include one or more 3GPP defined functions or CAPIF functions (e.g., CCF 204) and/or related functionality. In some embodiments, CAPIF node 300 may include an authorization server, a data repository, a network gateway, a network proxy, an edge security device, and/or other functionality.

In some embodiments, CAPIF node 300 may include CCF 204 or related functionality. For example, CAPIF node 300 may include or access a repository of PLMN and third party service APIs. In this example, API invoker(s) 310 (e.g., NFs like AFs 106 or applications thereof) and AEFs 210 may use discovery procedures to identify relevant service APIs in the repository. Continuing with this example, CAPIF node 300 may also authenticate and/or authorize API invoker(s) 310 to use one or more of the service APIs and may also log and charge API invoker(s) 310 for the service usage.

In some embodiments, e.g., where CAPIF node 300 includes CCF 204 or related functionality, CAPIF node 300 may utilize CAPIF interfaces defined in 3GPP TS 23.222. For example, a CAPIF-1 interface (or a CAPIF-1e interface for entities outside a "home" trust domain of CAPIF node 300) may be used for communications between CAPIF node 300 and API invoker(s) 310; a CAPIF-3 interface (or a CAPIF-3e interface for entities outside a "home" trust domain of CAPIF node 300) may be used for communications between CAPIF node 300 and AEF 210; a CAPIF-4 interface (or a CAPIF-4e interface for entities outside a "home" trust domain of CAPIF node 300) may be used for communications between CAPIF node 300 and APF 212; a CAPIF-5 interface (or a CAPIF-5e interface for entities outside a "home" trust domain of CAPIF node 300) may be used for communications between CAPIF node 300 and AMF 214; and a CAPIF-6 interface (or a CAPIF-6e interface for entities outside a "home" trust domain of CAPIF node 300) may be used for communications between CAPIF node 300 and another CAPIF node 300 or CCF 204.

In some embodiments, CAPIF node 300 may include AEF 210 or related functionality and may utilize a CAPIF-2 or a CAPIF-2e interface as defined in 3GPP TS 23.222. For example, CAPIF node 300 may be the provider of various services as APIs. In this example, CAPIF node 300 may validate the authorization of API invoker(s) 310, provide a service to API invoker(s) 310, and log the invocations on CCF 204 and request charging for the service usage. In some embodiments, CAPIF node 300 or AEF 210 thereof may wrap around various 3GPP functions to enable APIs to be exposed. For example, NEF APIs can be exposed via AEF 210 with API invoker(s) 310 on top, which has access to CCF 204 for on-boarding and discovery and the availability of services provided by AEF 210.

Referring to FIG. 3, CAPIF node 300 may include one or more communications interface(s) 302 for communicating messages via a communications environment, e.g., one or more 5G networks. For example, communications interface(s) 302 may include one or more communications interfaces for communicating with various entities in a home network (e.g., home public land mobile network (H-PLMN)) or a visited network (e.g., a visited public land mobile network (V-PLMN)).

CAPIF node 300 or entities therein may interact with various entities, such as API provider(s) 308, API invoker(s) 310, and/or an administrator or admin 312. Each of API provider(s) 308 may represent a physical or logical entity (e.g., APIPD 206 or 208) in a trust domain (e.g., trust domain 201) and may include various CAPIF functions (e.g., AEF 210, APF 212, and/or AMF 214) for providing service APIs or related operations. Each of API invoker(s) 310 may represent a physical or logical entity (e.g., an AF, a network node, one of API invokers 216-220) that uses or invokes a service or a related service API provided via AEF 210. Admin 312 may represent a CAPIF administrator, a network operator or other entity (e.g., a management node) that creates, updates, and/or deletes AEF groups and/or performs other CAPIF related tasks, e.g., providing auto-onboard statuses for AEF group members (e.g., API invoker(s) 310) and AEF group based metrics that are to be enforced during service usage by API invoker(s) 310.

CAPIF node 300 may include a resource manager (RM) 304. RM 304 may be any suitable entity (e.g., software executing on at least one processor) for performing various operations associated resource management including, for example, AEF groups and related operations. For example, RM 304 may be configured for receiving an AEF group creation message for creating an AEF group associated with API invoker(s) 310, wherein the AEF group creation message includes AEF group information indicating one or more service APIs usable by API invoker(s) 310 and storing the AEF group information. In this example, e.g., after receiving an API discovery request or as part of an onboarding procedure involving API invoker(s) 310, RM 304 may be configured for determining, using the AEF group information, service API information associated with the AEF group for API invoker(s) 310 and providing the service API information to API invoker(s) 310.

In some embodiments, CAPIF node 300, RM 304, or another entity may provide the capability to allow AMF 214 to register or deregister API provider(s) 308, e.g., APIPD 206 or domain functions therein (e.g., AEF 210 and APF 212). For example, API provider(s) 308 or AMF 214 therein may send an HTTP POST message (e.g., using a CAPIF_API_Provider_Management_API API) to CAPIF node 300 or CCF 204 therein. In this example, the payload of the HTTP POST message may include APIPD enrolment details, APIPD function details, and registration information. Various examples of registration information or related information is defined in section 8.9 of 3GPP TS 29.222.

In some embodiments, CAPIF node 300, RM 304, or another entity may provide the capability to allow APF 212 to publish and unpublish service APIs, e.g., usable by API invoker(s) 310 via AEF 210. For example, API provider(s) 308 (e.g., NEF 118) or APF 212 therein may use an API (e.g., a CAPIF_Publish_Service_API API) to publish an API using an HTTP POST message. In this example, the payload of the HTTP POST message may include API publisher information, service API information, and shareable information, e.g., as defined in section 8.2 of 3GPP TS 29.222.

In some embodiments, CAPIF node 300, RM 304, or another entity may provide the capability to onboard or add new API invoker(s) 310, to support granting API invoker(s) 310's request(s) to onboard with an administrator, to support offboarding API invoker(s) 310, and/or to update an API invoker(s) 310's API list, e.g., after the discovery of new API(s). For example, when onboarding as an API invoker at CAPIF node 300, AF 106 may send an HTTP POST message (e.g., using a\n CAPIF_API_Invoker_Management_API API) to CAPIF node 300 or CCF 204 therein. In this example, the payload of the HTTP POST message may include an API invoker enrolment details object, an API list indicating service APIs that the API invoker(s) 310 would like to access, and a notification destination URI. Various examples of onboarding information or related information is defined in section 8.4 of 3GPP TS 29.222.

In some embodiments, e.g., during an onboarding process, CAPIF node 300 or entities therein may be configured for identifying an AEF group associated with an onboarding API invoker 310 and may obtain (e.g., from stored AEF group information) an API list of authorized service APIs for AEF group members. In such embodiments, CAPIF node 300 or entities therein may verify requested service APIs from an API list in an onboard API invoker request message by comparing it to the list of authorized service APIs associated with the AEF group and removing those service APIs that are not allowed (e.g., as indicated by the AEF group). For example, CAPIF node 300 or entities therein may remove any requested service APIs that are not authorized for that AEF group and may indicate to onboarding API invoker 310 that the remaining requested service APIs can be used, e.g., by sending an onboard API invoker response message indicating the service APIs that are available to API invoker 310.

In some embodiments, CAPIF node 300, RM 304, or another entity may provide or support an API (e.g., a CAPIF_Discover_Service_API API) to allow one or more API invoker(s) 310 (e.g., after onboarding) to discover various service APIs supported or registered by one or more API provider(s) 308 (e.g., as defined in section 8.1 of 3GPP TS 29.222). In some embodiments, API invoker(s) 310 may subscribe (e.g., a CAPIF_Events_API API) with CAPIF node 300 or a related entity to receive information regarding changes in availability of all or specific service APIs. Various examples of subscription message information or notification message information is defined in section 8.3 of 3GPP TS 29.222.

In some embodiments, e.g., during an service API discovery process, CAPIF node 300 or entities therein may be configured for identifying an AEF group associated with an API invoker 310 and obtaining (e.g., from stored AEF group information) an API list of authorized service APIs for API invoker 310. In some embodiments, CAPIF node 300 or entities therein may provide the API list associated with the AEF group in a service API discovery response message.

In some embodiments, e.g., during an service API discovery process and after determining an API list of authorized service APIs for API invoker 310 based on a related AEF group, CAPIF node 300 or entities therein may determine service APIs based on search criteria in a service API discovery request message and then verify these service APIs by comparing it to the authorized service APIs associated with the AEF group and removing those service APIs that are not allowed (e.g., as indicated by the AEF group). For example, assuming API invoker 310 is associated with a particular AEF group, CAPIF node 300 or entities therein may remove any discovered service APIs that are not authorized for that AEF group and indicate to API invoker 310 that the remaining discovered service APIs can be used, e.g., by sending a service API discovery response message indicating the service APIs that are available to API invoker 310.

In some embodiments, CAPIF node 300, RM 304, or another entity therein may support one or more APIs for managing (e.g., creating, updating, and/or deleting) AEF groups (e.g., by admin 312). For example, admin 312 may send a group creation request (e.g., an HTTP POST message) to CAPIF node 300 or RM 304 therein via a CAPIF-5 or another interface.

In some embodiments, group data for defining an AEG group may be provided to RM 304 or another entity in one or more messages (e.g., group creation requests or group update requests) or data elements or information elements (IEs) therein. For example, group information may be stored in a vendor-specific data structure (as defined in section 6.6.3 of TS 29.500) or a related element. An example of vendor-specific data indicating or defining an AEF group is shown below.

```
"vendorSpecific-000123": {
   "aefgroupId":"group001",
   "apiProviderInfo":[
      {"apiProviderId":"provider-001",
         "aefIds":[
            {"aefId":"aef-001",
               "api":[
                  "nidd",
                  "monitoring"
               ]
            }
         ]
      }
   ]
}
```

In some embodiments, an example group creation request may be an HTTP POST type message with a URI in the form of "/{apiroot}/group-creation" and may be initiated by admin 312. In such embodiments, the group creation request may include group data (e.g., JSON data) defining the AEF group and/or related attributes, e.g., a group ID, a rate limit to enforce, a time period for when the AEF group is active, etc.

In some embodiments, an example group creation response may be a 204 No Create type message and may include a location header associated with the created group resource, e.g., the location header may indicate the group ID identifying the created AEF group.

In some embodiments, admin 312 may update an existing AEF group by sending a group update request to CAPIF node 300. For example, an example group update request may be an HTTP PUT/patch type message with a URI in the form of "/{apiroot}/group-creation/<group-id>" and may be initiated by admin 312. In such embodiments, the group update request may include updated group data (e.g., JSON data) defining the AEF group and/or updated attributes, e.g., a group ID, a rate limit to enforce, a time period for when the AEF group is active, etc.

In some embodiments, an example group update response may be a 200 OK type message and may include a location header associated with the updated group resource, e.g., the location header may indicate the group ID identifying the created AEF group.

In some embodiments, admin 312 may retrieve stored AEF group information by sending a group get request to CAPIF node 300. For example, an example group get request may be an HTTP GET type message with a URI in the form of "/{apiroot}/group-creation/<group-id>" and may be initiated by admin 312.

In some embodiments, an example group update response may be a 200 OK type message and may include a content header associated with the requested group resource, e.g., the content header may include group data and related group attributes.

In some embodiments, an example group delete request may be an HTTP DELETE type message with a URI in the form of "/{apiroot}/group-creation/<group-id>" and may be initiated by admin 312.

In some embodiments, an example group delete response may be a 200 OK type message and may include a content header associated with the deleted group resource.

In some embodiments, CAPIF node 300, RM 304, or another entity may use AEF groups when determining appropriate services (e.g., service APIs) that are accessible to API invoker(s) 310. For example, an AEF group may indicate three service APIs are allowed for associated API invoker 216. In this example, during an onboarding procedure involving API invoker 216 or in response to receiving an API discovery request from API invoker 216, CAPIF node 300 or RM 304 therein may identify the AEF group associated with API invoker 216, restrict potential service APIs based on the three allowed service APIs indicated by the AEF group, and send a response message (e.g., an API discovery response or an onboard API invoker response) indicating the three allowed service APIs or a subset thereof.

In some embodiments, CAPIF node 300, RM 304, or another entity may use AEF groups or related information when determining whether to notify (e.g., about changing of availability of API endpoints) to subscribed API invoker(s) 310. For example, CAPIF node 300, RM 304, or another entity may be configured to notify subscribed API invoker(s) 310 about a service API being added or deleted (e.g., at or during runtime) from an AEF group.

CAPIF node 300, RM 304, or another entity may access (e.g., read from and/or write information to) data storage 306. Data storage 306 may be any suitable entity (e.g., a computer readable medium or memory) for storing various data. In some embodiments, data storage 306 may include a context data store for storing AEF groups, session information, and/or other data, a profile data store for storing provisioning or configuration data associated with AEF groups or other entities, various data stores comprising API information and/or authentication related information, and/or other information. In some embodiments, data storage 306 may include logic for performing various aspects associated with CAPIF node functions, CCF function, and/or AEF functions. In some embodiments, data storage 306 may include logic for performing various aspects of supporting AEF groups or related operations.

It will be appreciated that FIG. 3 and its related description are for illustrative purposes and that CAPIF node 300 may include additional and/or different modules, components, or functionality.

FIG. 4 depicts example information 400 for creating an AEF group. Information 400 may include field names, data types, mandatory or optional statuses, descriptions, and other information usable in creating an AEF group or a related AEF group creation message.

Referring to FIG. 4, information 400 is depicted in a tabular format comprising columns and/or fields for field names, data types, mandatory or optional statuses, and descriptions. For example, each row may represent a data element associated with an AEF group and related metadata.

A "field name" field may store information for indicating or identifying a particular field, parameter, or data element usable for defining aspects or attributes of an AEF group. Example data in the "field name" field may include a unique identifier for identifying or indicating a data element or sub-element for defining an aspect of an AEF group. For example, an "aefgroupId" field represents a data element for identifying an AEF group, an "apiProviderinfo" field represents a data element for identifying information associated with a particular API provider, an "apiProviderInfo.aeflds" field represents a sub-element of an "apiProviderInfo" element for identifying aeflds associated with a particular API provider domain (e.g., APIPD 206 or 208), and an "apiProviderInfo.aeflds.apis" field represents a sub-element of an "apiProviderInfo.aeflds" element for identifying service APIs associated with a particular AEF (or aefld).

A "data type" field may store information for indicating or identifying a particular data type for representing data associated with a particular field or data element associated with an AEF group. Example data in the "data type" field may include data representing a string data type or a list data type (e.g., a data object comprising one or more data elements of a particular type. Example elements in a list data type may include provider information, aeflds, APIs, or other data types.

A "mandatory or optional status" field may store information for indicating whether a field or parameter is mandatory or optional when creating an AEF group. Example data in the "mandatory or optional status" field may be a value or letter, where a value of "0" or "O" indicates that the field or parameter is optional and where a value of "1" or "M" indicates that that the field or parameter is mandatory.

A "description" field may store information for describing a field or parameter associated with an AEF group. Example data in the "description" field may includes text or other information indicating what the field represents or the data that the field provides.

It will be appreciated that information 400 is for illustrative purposes and that different and/or additional data than the data depicted in FIG. 4 may be usable for creating an AEF group and/or usable for performing various related operations.

FIG. 5 depicts example information 500 for updating an AEF group. Information 500 may include field names, data types, mandatory or optional statuses, descriptions, and/or other information usable in updating an AEF group or a related AEF group update message.

Referring to FIG. 5, information 500 is depicted in a tabular format comprising columns and/or fields for field names, data types, mandatory or optional statuses, and descriptions. For example, each row may represent a data element associated with an AEF group and related metadata.

A "field name" field may store information for indicating or identifying a particular field, parameter, or data element usable for defining aspects or attributes of an AEF group. Example data in the "field name" field may include a unique identifier for identifying or indicating a data element or sub-element for defining an aspect of an AEF group. For example, an "aefgroupId" field represents a data element for identifying an AEF group, an "apiProviderinfo" field represents a data element for identifying information associated with a particular API provider, an "apiProviderInfo.aeflds" field represents a sub-element of an "apiProviderInfo" element for identifying aeflds associated with a particular API provider domain (e.g., APIPD 206 or 208), and an "apiProviderInfo.aeflds.apis" field represents a sub-element of an "apiProviderInfo.aeflds" element for identifying service APIs associated with a particular AEF (or aefld).

A "data type" field may store information for indicating or identifying a particular data type for representing data associated with a particular field or data element associated with an AEF group. Example data in the "data type" field may include data representing a string data type or a list data type (e.g., a data object comprising one or more data elements of a particular type. Example elements in a list data type may include provider information, Aeflds, APIs, or other data types.

A "mandatory or optional status" field may store information for indicating whether a field or parameter is mandatory or optional when updating an AEF group. Example data in the "mandatory or optional status" field may be a value or letter, where a value of "0" or "O" indicates that the field or parameter is optional and where a value of "1" or "M" indicates that that the field or parameter is mandatory.

A "description" field may store information for describing a field or parameter associated with an AEF group. Example data in the "description" field may includes text or other information indicating what the field represents or the data that the field provides.

In some embodiments, information 500 may include information about elements or parameters for defining an AEF group or related attributes. For example, an AEF group update request may be a PUT or PATCH message with a URI in the form of "/{apiroot}/group-creation/<group-id>" (where <group-id> is information received in a location header of group creation response) and may be initiated by admin 312. In this example, the AEF group update request may also include group data (e.g., as JSON formatted data) defining the updated AEF group, where elements of the group data or related metadata is based on information 500.

It will be appreciated that information 500 is for illustrative purposes and that different and/or additional data than the data depicted in FIG. 5 may be usable for creating an AEF group and/or usable for performing various related operations.

Figure 6:
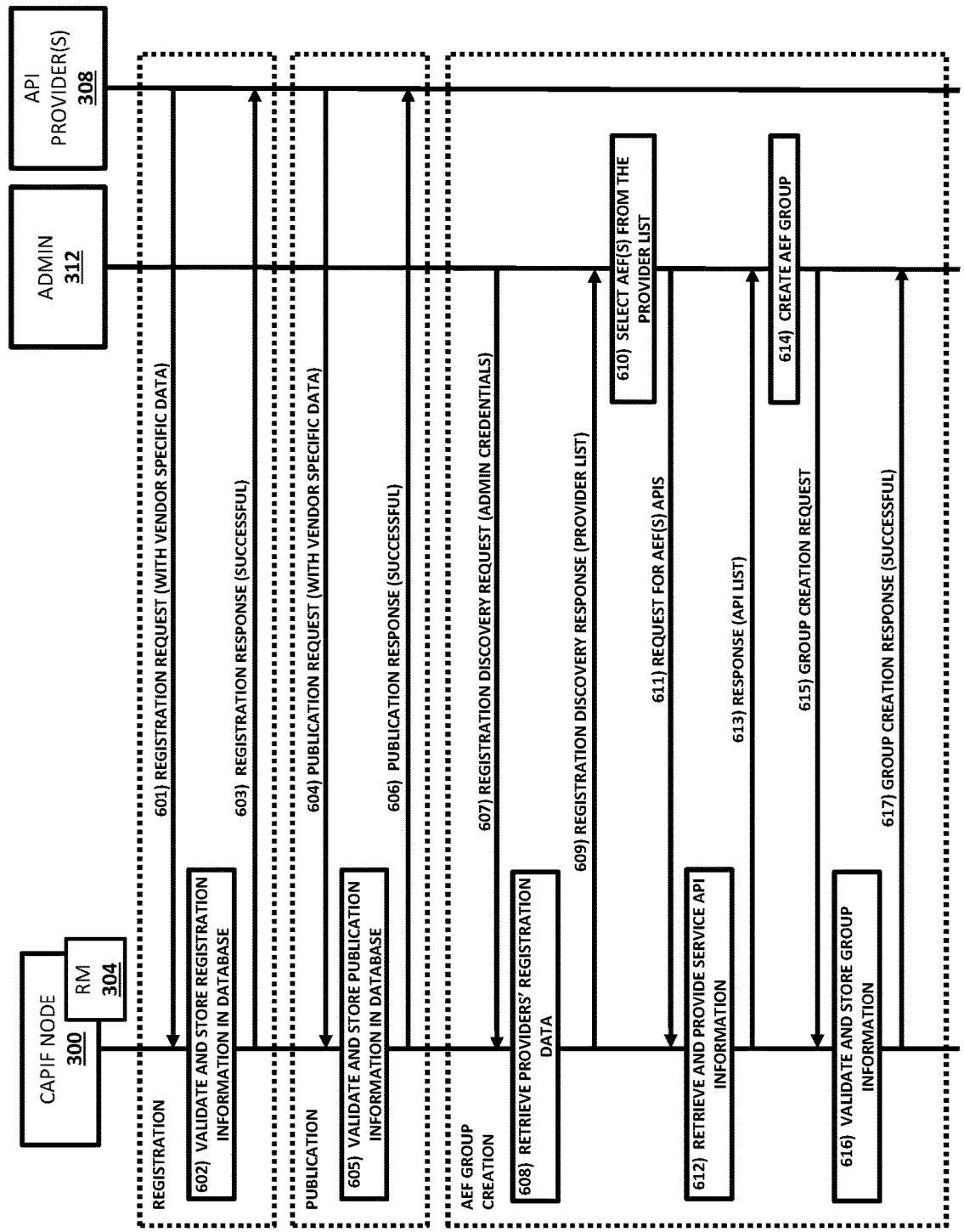
FIG. 6 is a message flow diagram illustrating various operations associated with AEF groups.

FIG. 6 is a message flow diagram illustrating various operations associated with AEF groups. In some embodiments, CAPIF node 300 or RM 304 therein may support one or more APIs (e.g., a CAPIF_API_provider_management API as defined in 3GPP TS 23.222) for registering, deregistering, and/or updating registration information of domain functions (e.g., AEF 210, APF 212, etc.) as a recognized API provider (e.g., APIPD 206 or API provider 308) of the CAPIF domain (e.g., trust domain 200). In some embodiments, CAPIF node 300 or RM 304 therein may support one or more APIs (e.g., a CAPIF_publish_service_API API as defined in 3GPP TS 23.222) for managing or publishing services (e.g., service APIs) at CAPIF node 300 or CCF 204 therein. In some embodiments, CAPIF node 300 or RM 304 therein may support one or more APIs (e.g., a CAPIF_A-PI_invoker_management API as defined in 3GPP TS 23.222) for managing API invoker(s) 310 at CAPIF node 300 or CCF 204 therein, e.g., onboarding, offboarding, updating API invoker details, etc.

In some embodiments, CAPIF node 300 or RM 304 therein may support one or more APIs for managing (e.g., creating, updating, and/or deleting) AEF groups (e.g., by admin 312). In such embodiments, CAPIF node 300 or RM 304 therein may use AEF groups when determining appropriate services (e.g., service APIs) to provide to API invoker(s) 310. For example, an AEF group may indicate three service APIs are allowed for an associated or assigned API invoker 216. In this example, during an onboarding procedure involving API invoker 216 or in response to receiving an API discovery request from API invoker 216, CAPIF node 300 or RM 304 therein may identify the AEF group associated with API invoker 216, restrict potential service APIs based on the three allowed service APIs indicated by the AEF group, and send a response message (e.g., an API discovery response or an onboard API invoker response) indicating the three allowed service APIs or a subset thereof.

Steps 601-603 depict an example registration process involving an API provider 308 (e.g., APIPD 206 or AMF 214 therein) registering one or more API provider domain functions (e.g., endpoint(s) providing AEF 210 and/or APF 212) with CAPIF node 300 or CCF 204 therein.

In step 601, a registration request message (e.g., an HTTP POST message) for registering one or more API provider domain functions (e.g., endpoint(s) providing AEF 210 and/or APF 212) may be sent from API provider 308 (e.g., APIPD 206 or AMF 214 therein) to CAPIF node 300. In some embodiments, the registration request message may include APIProviderEnrolmentDetails associated with API provider 308; various identifiers for indicating API provider 308, AEF 210, and/or APF 212; and/or vendor-specific data indicating various attributes or details associated with API provider 308.

In step 602, CAPIF node 300 or RM 304 therein may validate the registration request message and/or the sender (e.g., API provider 308) and may store registration related information in one or more data stores (e.g., in data storage 306).

In step 603, a registration response message (e.g., an HTTP 201 Created message) indicating a successful registration may be sent from CAPIF node 300 to API provider 308 or AMF 214 therein.

Steps 604-606 depict an example publication process involving an API provider 308 (e.g., APIPD 206 or APF 212 therein) publishing one or more service APIs with CAPIF node 300 or CCF 204 therein.

In step 604, a publication request message (e.g., a service API publish request or an HTTP POST message) for registering one or more service APIs may be sent from API provider 308 (e.g., APIPD 206 or APF 212 therein) to CAPIF node 300. In some embodiments, the publication request message may include API publisher information, service API information (e.g., a service API name, a service API type, a communication type, a description, interface details such as an IP address, a port number, a URI, etc.), and/or various attributes or details (e.g., sharable information) associated with one or more service APIs.

In step 605, CAPIF node 300 or RM 304 therein may validate the publication request message and/or the sender (e.g., API provider 308) and may store service API related information in one or more data stores (e.g., in an API registry or data storage 306).

In step 606, a publication response message (e.g., a service API publish response or an HTTP 201 Created message) indicating a successful publication may be sent from CAPIF node 300 to API provider 308 or APF 212 therein.

Steps 607-617 depict an example AEF group creation process involving an admin 312 (e.g., a CAPIF administrator or a network operator) creating an AEF group for indicating authorized or allowed service APIs for use by corresponding API invoker(s) 310. In some embodiments, an AEF group creation process may involve admin 312 obtaining registration information about available API providers 308, identifying all service APIs associated with those API providers 308, and creating an AEF group for API invoker(s) 310 indicating at least some of those service APIs as authorized or usable by API invoker(s) 310.

In step 607, a registration discovery request (gets all registration information) message (e.g., an HTTP GET message) for discovering registration information associated with registered AEFs 210 or related API providers 308 may be sent from admin 312 to CAPIF node 300, e.g., via a custom interface or a CAPIF-5 interface. In some embodiments, the registration discovery request message may include credentials or other security information for obtaining the registration information.

In step 608, CAPIF node 300 or RM 304 therein may validate the registration discovery request message and/or the sender (e.g., admin 312) and may retrieve registration related information from one or more data stores (e.g., in data storage 306).

In some embodiments, e.g., if AEFs 210 are registered with a different CAPIF node (or CCF 204) or in a different trust domain (e.g., trust domain 202), CAPIF node 300 may request and receive registration information from another CAPIF node or CCF 204, e.g., via a CAPIF 6-e interface.

In step 609, a registration discovery response message (e.g., an HTTP 200 OK message) including registration information (e.g., a list of aeflds indicating AEFs 210) associated with registered AEFs 210 or related API providers 308 may be sent from CAPIF node 300 to admin 312 e.g., via a custom interface or a CAPIF-interface.

In step 610, admin 312 may select one or more AEFs 210 from the received registration information and may request published service APIs associated with these selected AEFs 210.

In step 611, a request message (e.g., an HTTP Get message) for published service API information associated with one or more AEFs 210 may be sent from admin 312 to CAPIF node 300, e.g., via a discovery API or a CAPIF-4 interface. In some embodiments, the request message may include credentials or other security information for obtaining the service API information.

In step 612, CAPIF node 300 or RM 304 therein may validate the request message and/or the sender (e.g., admin 312) and may retrieve published service API information from one or more data stores (e.g., in data storage 306).

In step 613, a response message (e.g., an HTTP 200 OK message) including service API information (e.g., a list of service API names and/or related URIs) associated with AEFs 210 may be sent from CAPIF node 300 to admin 312 e.g., via a discovery API or a CAPIF-4 interface.

In step 614, admin 312 may select one or more service APIs from the received service API information for a new AEF group. In some embodiments, admin 312 may identify various attributes for the new AEF group. For example, group attributes may include a group identifier and a rate limit or other metrics for enforcement, e.g., by API providers 308 or other CAPIF entities.

In step 615, a group creation request message (e.g., an HTTP POST message) for creating the AEF group may be sent from admin 312 to CAPIF node 300. In some embodiments, the group creation request message may include JSON data or other information for defining an AEF group and may indicate allowed or authorized AEFs 210 and service APIs for group members.

In step 616, CAPIF node 300 or RM 304 therein may validate the group creation request message and/or the sender (e.g., admin 312) and may store the group related information in one or more data stores (e.g., in data storage 306).

In step 617, a group creation response message (e.g., an HTTP 201 Created message) indicating that the AEF group is created. In some embodiments, the group creation response message may include a "location" header of a created group resource.

In some embodiments, when an AEF group is updated (e.g., service APIs associated with the AEF group are added or deleted), a notification may be sent to relevant API invoker(s) 310 so that API invoker(s) 310 can refresh its content (e.g., service API information) with respect to the updated AEF group information.

It will be appreciated that FIG. 6 is for illustrative purposes and that different and/or additional messages may be communicated and/or actions may be performed. It will also be appreciated that various messages and/or actions described herein may occur in a different order or sequence.

Figure 7:
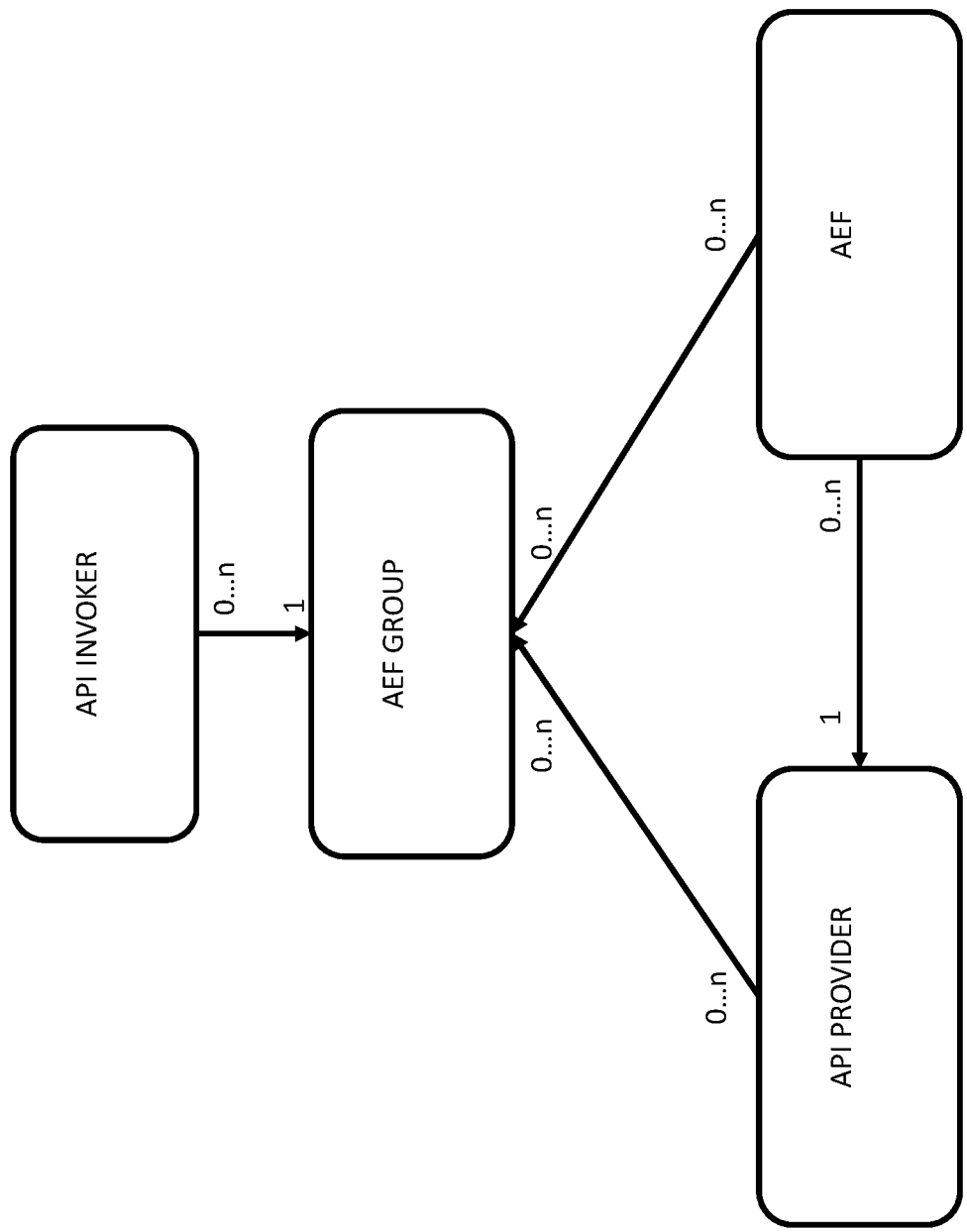
FIG. 7 is a relational diagram illustrating aspects of an AEF group.

FIG. 7 is a relational diagram 700 illustrating aspects of an example AEF group. Referring to diagram 700, various entities 702-708 associated with an AEF group as depicted with information indicating whether an entity has a one-to-many, a many-to-one, a none or more to one, or a one to none or more relationship.

As depicted in FIG. 7, diagram 700 shows relationships involving an API invoker, an AEF group, an API provider, and an AEF. Diagram 700 indicates that each API invoker can be associated with one AEF group and that each AEF group can be associated with zero or more different API invokers. Diagram 700 also indicates that each AEF group can be associated with zero or more API providers and zero or more AEFs. Diagram 700 also indicates that each AEF can be associated with zero or more AEF groups, but just one API provider. Diagram 700 also indicates that each API provider can be associated with zero or more AEF groups and zero or more AEFs.

It will be appreciated that diagram 700 is for illustrative purposes and that other relationships may be possible in various environments or embodiments.

Figure 8:
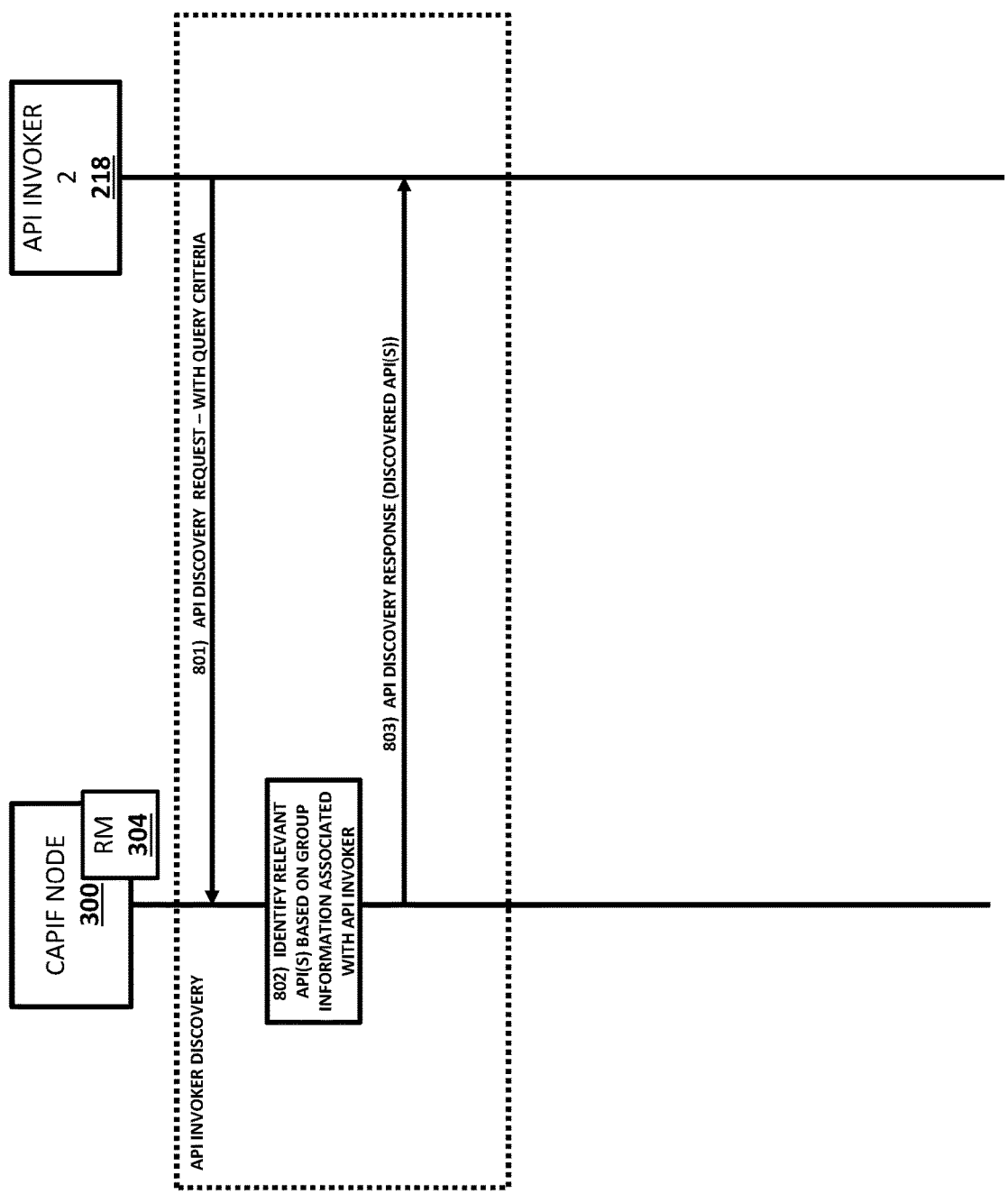
FIG. 8 is a message flow diagram illustrating an example API discovery procedure involving a CAPIF node.

FIG. 8 is a message flow diagram illustrating an example API discovery process involving CAPIF node 300. In some embodiments, CAPIF node 300 or RM 304 therein may support a discover service API (e.g., as defined in 3GPP TS 29.222) for allowing API invoker(s) 310 (e.g., API invokers 216-218) to discover available or relevant service APIs or related endpoints via CAPIF node 300. For example, after receiving an API discovery request message from API invoker 218, CAPIF node 300 may provide service API information (e.g., one or more service API IDs and/or related information indicating APIs or related endpoints) available to API invoker(s) 308 based on a corresponding AEF group.

In some embodiments, CAPIF node 300 or RM 304 therein may be configured to identify, select, or provide authorized, allowed, or accessible APIs or related endpoints based on an AEF group or related information, e.g., stored at or by CAPIF node 300. For example, after receiving an API discovery request message or as part of an onboarding procedure involving API invoker 218, CAPIF node 300 or RM 304 therein may identify an AEF group associated with API invoker 218 and then determine a list of APIs (or related endpoints) that are allowed or accessible to members of the AEF group. In this example, CAPIF node 300 or RM 304 therein may provide the list of allowed APIs (e.g., if the request was for all service APIs) or may use the list of allowed APIs to filter or restrict matching service APIs (e.g., if the request was for service APIs that match search criteria) based on the AEF group associated with API invoker 218.

Referring to FIG. 8, API invoker 218 may initiate a service API discovery procedure with CAPIF node 300, where CAPIF node 300 or RM 304 therein provides CCF 204 or related functionality. In step 801, an API discovery request message (e.g., an HTTP GET message) for requesting all service APIs (or IDs thereof) at CAPIF node 300 may be sent from API invoker 218 to CAPIF node 300.

In step 802, CAPIF node 300 may receive the API discovery request message and identify relevant service API(s) or related endpoints using a corresponding AEF group and/or other information. In some embodiments, e.g., after receiving an API discovery request message or as part of an onboarding procedure, CAPIF node 300 or RM 304 therein may identify an AEF group associated with API invoker 218 and then determine a list of APIs (or related endpoints) that are allowed or accessible to members of the AEF group. In such embodiments, CAPIF node 300 or RM 304 therein may use the list of allowed APIs (or related endpoints) to filter or restrict discovered service APIs (or related endpoints) based on the AEF group associated with API invoker 218.

In some embodiments, in response to receiving an API discovery request message from API invoker 218, CAPIF node 300 or RM 304 therein may use API discovery related logic to create a list of APIs (or related endpoints) (e.g., a list of API IDs or Aeflds) for responding to the discovery service request.

In some embodiments, assuming API invoker 218 is associated with an AEF group, CAPIF node 300 or RM 304 therein may identify a list of APIs allowed or accessible to members of the AEF group and may remove APIs (or related endpoints) that are not in the list of allowed APIs, and may generate an API discovery response message indicating the remaining APIs (or related endpoints), e.g., the response may include one or more API IDs or Aeflds.

In some embodiments, in response to receiving an API discovery request message from API invoker 218 and assuming API invoker 218 is associated with an AEF group, CAPIF node 300 or RM 304 therein may identify an AEF group associated with API invoker 218 and then determine a list of APIs allowed or accessible to members of the AEF group. In this example, CAPIF node 300 or RM 304 therein may remove APIs (or related endpoints) in the list of allowed APIs (e.g., if they do not meet query criteria), and may generate an API discovery response message indicating the remaining APIs (or related endpoints), e.g., the response may include one or more API IDs or Aeflds.

In some embodiments, when API invoker 218 is onboarded automatically and when an API list indicating a set of requested services is in an API discovery request message, CAPIF node 300 or RM 304 therein may determine that the API discovery request message is authorized and then use AEF group information to validate the API list received in the API discovery request message.

In some embodiments, when no group is assigned to API invoker 218, CAPIF node 300 or RM 304 therein may utilize a default group for API invoker 218 and determining appropriate service APIs based on the list of service APIs associated with the default.

In some embodiments, when no group is assigned to API invoker 218, CAPIF node 300 or RM 304 therein may treat API invoker 218 as a premium tier invoker, e.g., by allowing access to all AEFs 210 and service APIs thereof.

In step 803, an API discovery response message (e.g., an HTTP 200 OK message) indicating all relevant and available APIs (or related endpoints) may be sent from CAPIF node 300 to API invoker 218.

It will be appreciated that FIG. 8 is for illustrative purposes and that different and/or additional messages than those depicted in FIG. 8 may be communicated and/or different and/or additional actions than those depicted in FIG. 8 may be performed. It will also be appreciated that various messages and/or actions described herein may occur in a different order or sequence.

FIG. 9 depicts example AEF group information 900. Information 900 may include various information associated with a particular AEF group. For example, information 900 may include an AEF group ID for uniquely identifying an AEF group and group data for defining various aspects of the AEF group. In some embodiments, information 900 may include one or more performance or enforcement metrics (e.g., a rate limit, a bandwidth limit, a usage limit, etc.) associated with the AEF group. For example, API provider(s) 308 may enforce a AEF group based rate limit when providing a service to an AEF group member (e.g., API invoker(s) 310).

Referring to FIG. 9, information 900 is depicted in a tabular format comprising columns and/or fields for group IDs and related group data. For example, each row may represent an AEF group and related group data for defining the AEF group.

A "group ID" field may store information for indicating or identifying a particular AEF group. Example data in the "group ID" field may include a unique identifier (e.g., an integer or alpha-numeric value) for identifying or indicating a particular AEF group.

A "group data" field may store information for indicating aspects of the AEF group. Example data in the "group data" field may include JSON data or data in another format for defining an AEF group, where the data indicates one or more API provider IDs, one or more AEF IDs, and/or one or more API IDs associated with the AEF group. In some embodiments, group data or another field may include other information associated with an AEF group, e.g., one or more SLA metrics (e.g., rate limits) or invoker usage limits for more granular management of CAPIF related operations.

It will be appreciated that information 900 is for illustrative purposes and that different and/or additional data than the data depicted in FIG. 9 may be usable for defining AEF groups or related information (e.g., information indicating AEFs and/or service APIs associated with API invoker(s) 310, SLA metrics, etc.) associated with AEF groups.

FIG. 10 depicts example pre-provisioning rule (PPR) information 1000. Information 1000 may include various configuration information associated with a particular AEF group. For example, information 1000 may include an invoker PPR identifier (ID), an AEF group ID, an auto-onboard status parameter for indicating whether the API invoker can be auto-onboarded (e.g., by CCF 204 or CAPIF node 300), a start time parameter for indicating the start of an AEF group validity or usage period, and/or an end time parameter for indicating the end of an AEF group validity or usage period. In some embodiments, information 1000 may include one or more performance or enforcement metrics (e.g., a rate limit, a bandwidth limit, a usage limit, etc.) associated with the AEF group.

In some embodiments, information 1000 may be usable for determining when or if an API invoker can be auto-onboarded (e.g., onboarded without requiring admin 312 to manually approve the onboard request) by CAPIF node 300 or CCF 204 therein. For example, CAPIF node 300 or RM 304 therein may use start and end timestamps to identify a validity period indicating when an AEF group is active or in use.

In some embodiments, information 1000 may be usable in enforcing performance metrics (e.g., SLA metrics). For example, CAPIF node 300 or RM 304 therein may use or provide an API rate limit associated with an AEF group, where the rate limit may be enforced by API provider 308 when interacting with API invoker 310 that is associated with the AEF group.

Referring to FIG. 10, information 1000 is depicted in a tabular format comprising columns and/or fields for invoker PPR IDs, group IDs, auto-onboard statuses, start timestamps, and end timestamp. For example, each row may represent a rule or profile associated an AEF group and attributes indicating whether API invoker(s) 310 associated with the AEF group can be auto-onboarded and when the AEF group is valid or active.

An "invoker PPR ID" field may store information for indicating or identifying a particular rule, profile, or related configuration information associated with an AEF group. Example data in the "invoker PPR ID" field may include a unique identifier (e.g., an integer or alpha-numeric value) for identifying or indicating configuration information associated with a particular AEF group.

A "group ID" field may store information for indicating or identifying a particular AEF group. Example data in the "group ID" field may include a unique identifier (e.g., an integer or alpha-numeric value) for identifying or indicating a particular AEF group.

An "auto-onboard status" field may store information for indicating whether API invoker(s) 310 associated with the AEF group are to be automatically onboarded. Example data in the "auto-onboard status" field may be a Boolean value, where a value of "true" or "1" indicates that API invoker(s) 310 associated with the AEF group are to be automatically onboarded and where a value of "false" or "0" indicates that API invoker(s) 310 associated with the AEF group are not to be automatically onboarded.

A "start time" field may store information for indicating or identifying a start time associated with an AEF group or related auto-onboarding. For example, if a start time exists, the AEF group may be used to control or limit service APIs or used in onboarding or auto-onboarding when the actual time is the same as or later than the start time. Example data in the "start time" field may include data in a predetermined or standard format for indicating a date and time associated with a start time, such as 'YYYYMMDDmmhhss' (e.g., '20231223023500' may indicate that an AEF group or related usage starts on Dec. 23, 2023 at 2:35:00 AM). In some embodiments, if no start time data is associated with a PPR entry, then the AEF group may be active immediately (e.g., when the AEF group is created).

A "end time" field may store information for indicating or identifying an end time associated with an AEF group or related auto-onboarding. For example, if an end time exists, the AEF group is no longer used to control or limit service APIs or used in onboarding or auto-onboarding. Example data in the "end time" field may include data in a predetermined or standard format for indicating a date and time associated with an end time, such as 'YYYYMMDDmmhhss' (e.g., '20231223133500' may indicate that an AEF group or related usage starts on Dec. 23, 2023 at 1:35:00 PM). In some embodiments, if no end time data is associated with a PPR entry, then the AEF group may be active indefinitely (e.g., until the AEF group is deleted).

It will be appreciated that information 1000 is for illustrative purposes and that different and/or additional data than the data depicted in FIG. 10 may be usable for supporting AEF groups or related operations (e.g., onboarding and/or service API discovery) associated with AEF groups.

Figure 11:
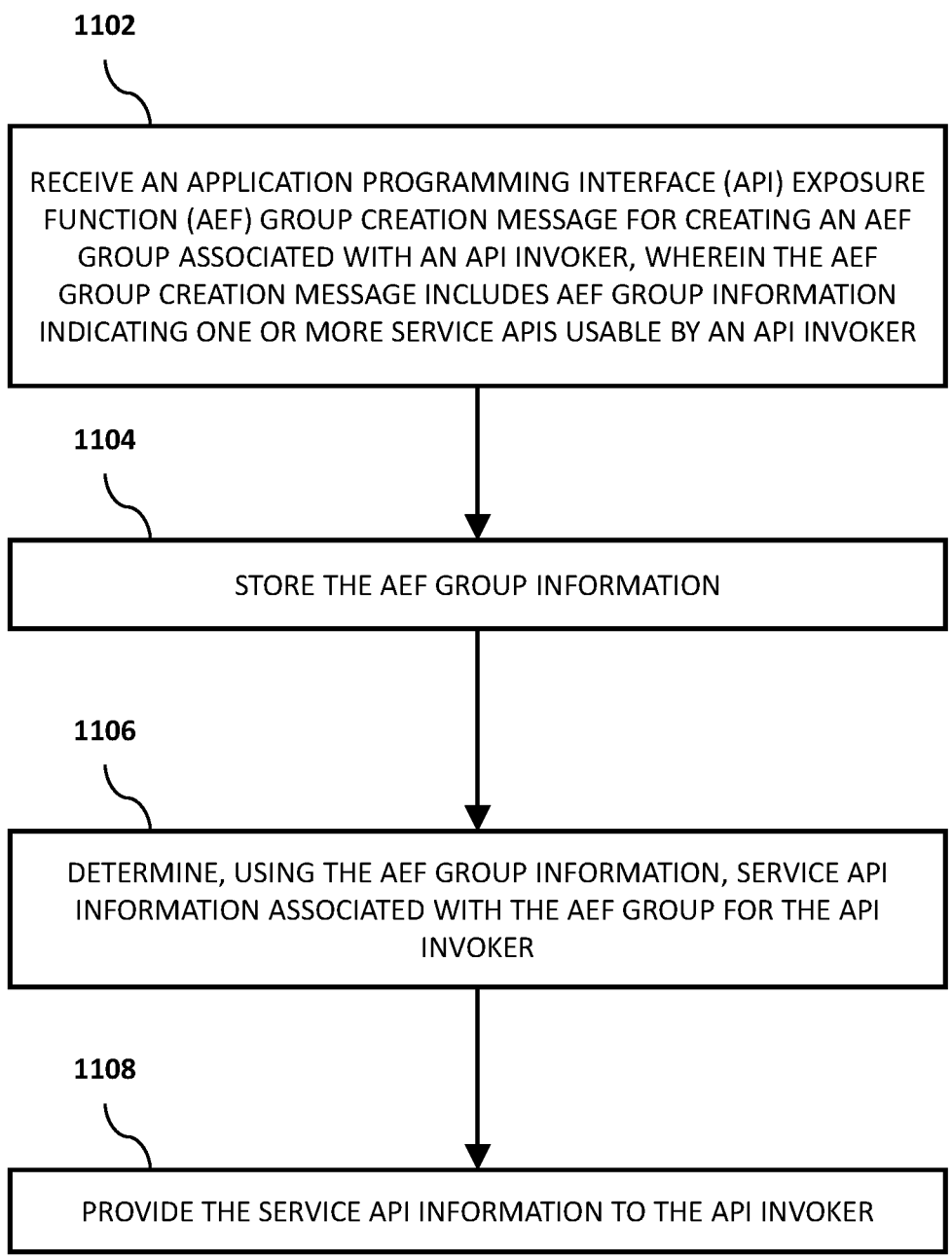
FIG. 11 is a flow chart illustrating an example process for using an AEF group.

FIG. 11 is a diagram illustrating an example process 1100 for using an AEF group. In some embodiments, example process 1100 described herein, or portions (e.g., operations or steps) thereof, may be performed at or performed by CAPIF node 300, RM 304, and/or a module or node.

Referring to process 1100, in step 1102, an AEF group creation message may be received for creating an AEF group associated with an API invoker. In some embodiments, the AEF group creation message may include AEF group information indicating one or more service APIs usable by an API invoker (e.g., API invoker 218).

In some embodiments, an AEF group creation message may be from an administrator or a network operator. For example, admin 312 may send an AEF group creation message to create an AEF group associated with API invoker 218.

In some embodiments, an AEF group creation message may be provided offline; during initialization of CAPIF node 300, AEF 210, or another CAPIF related entity; or prior to the CAPIF node being queried by an API invoker (e.g., API invoker 218).

In step 1104, the AEF group information may be stored (e.g., in data storage 306). In some embodiments, an AEF group creation message or AEF group information may indicate or include a group identifier, a list of one or more provider domains associated with the AEF group, a list of one or more AEFs 210 associated with the AEF group, a list of the one or more service APIs associated with the AEF group, a time period for the AEF group to be active or used, an auto-onboard status parameter for indicating whether associated API invoker(s) 310 can be auto-onboarded by CAPIF node 300 or CCF 204, and/or a performance or enforcement metric associated with the AEF group.

In step 1106, service API information associated with the AEF group for the API invoker may be determined using the AEF group information. In some embodiments, determining service API information may include filtering or otherwise preventing unauthorized service API information from being sent to the API invoker. For example, after receiving an API discovery request from API invoker 216, if CAPIF node 300 identifies relevant service APIs based on criteria in the API discovery request from API invoker 216, before sending an API discovery response, CAPIF node 300 may compare the results to service APIs allowed by the AEF group associated with API invoker 216 and may remove those service APIs that are not authorized or allowed by the AEF group.

In step 1108, the service API information may be provided to the API invoker. In some embodiments, service API information may be provided in an API discovery response or in an onboard API invoker response. For example, API invoker 218 may send an API discovery request for requesting relevant service APIs to CAPIF node 300, CAPIF node 300 may determine the service APIs based on the AEF group associated with API invoker 218, and CAPIF node 300 may send service API information in an API discovery response to API invoker 218. In another example, as part of an onboarding procedure (e.g., after receiving an onboard API invoker request), CAPIF node 300 may send an onboard API invoker response including service API information to API invoker 218.

In some embodiments, CAPIF node 300 may support various operations associated with generating, updating, and/or deleting AEF groups. For example, CAPIF node 300 may receive and process AEF group creation messages for creating AEF groups, AEF group update messages for changing existing AEF groups, and/or AEF group deletion messages for deleting AEF groups.

In some embodiments, CAPIF node 300 may include CCF 204 or similar functionality. For example, CAPIF node 300 may allow API invokers 310 and AEFs 210 to discover service APIs, authenticate and authorize API invokers 310 for usage of the service APIs, and perform logging and charging associated with related service API invocations.

In some embodiments, an API invoker may be an application function that is in a trust domain of the CAPIF node or that is external to the trust domain of CAPIF node 300. For example, API invoker(s) 310 may communicate with CAPIF node 300 via CAPIF-1 or CAPIF-1e depending on whether API invoker(s) 310 is in the trust domain of CAPIF node 300 or external to the trust domain of CAPIF node 300.

It will be appreciated that process 1100 is for illustrative purposes and that different and/or additional messages may be communicated and/or actions may be performed. It will also be appreciated that various messages and/or actions described herein may occur in a different order or sequence.

It will be appreciated that while some aspects of the subject matter described herein has been discussed with reference to 5G networks various other networks may utilize some aspects of the subject matter described herein. For example, any network that allows or utilizes CAPIF node or CAPIF node-like functions may use features, systems, mechanisms, and/or techniques described herein to support API related grouping and/or related operations, e.g., by controlling access to the service APIs exposed to particular API invokers 310 and/or by enforcing rate limits or other SLA metrics at the API invoker level or AEG group level.

It should be noted that CAPIF node 300, RM 304, and/or functionality described herein may constitute a special purpose computing device. Further, CAPIF node 300, RM 304, and/or functionality described herein can improve the technological field of network communications. For example, CAPIF node 300 may include RM 304 and may be capable of supporting AEF groups or related techniques for securing the service APIs exposed to various API invokers 310. In this example, admin 312 may generate and update AEF groups or related information (e.g., offline or prior to API invokers 310 onboarding or requesting available service APIs or related AEFs 210). Continuing with this example, AEF groups can also be used for enforcing performance or SLA metrics (e.g., rate limits, speeds, bandwidth, invoker usage, etc.) associated with API invoker(s) 310 or related service APIs. For example, admin 312 may associate SLA metrics and an AEF group. In this example, CAPIF node 300 or API provider(s) 308 may be configured to enforce or attempt to enforce the SLA metrics at the API invoker level (e.g., determined by the AEF group associated with API invoker 218).

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 23.222; 3rd Generation Partnership Project; Technical Specification Group Services and System Aspects; Functional architecture and information flows to support Common API Framework for 3GPP Northbound APIs; Stage 2 (Release 16); V16.10.0 (2021-06).
2. 3GPP TS 29.222; 3rd Generation Partnership Project; Technical Specification Group Core Network and Terminals; Common API Framework for 3GPP Northbound APIs; (Release 16); V16.7.0 (2021-06).
3. 3GPP TS 29.510; 3rd Generation Partnership Project; Technical Specification Group Core Network and Terminals; 5G System; Network Function Repository Services; Stage 3 (Release 16); V16.9.0 (2021-09).
4. 3GPP TS 29.522; 3rd Generation Partnership Project; Technical Specification Group Core Network and Terminals; 5G System; Network Exposure Function Northbound APIs; Stage 3 (Release 16); V16.9.0 (2021-09).
5. 3GPP TS 29.122; 3rd Generation Partnership Project; Technical Specification Group Core Network and Terminals; T8 reference point for Northbound APIs; (Release 16); V16.11.0 (2021-09).
6. 3GPP TS 29.500; 3rd Generation Partnership Project; Technical Specification Group Core Network and Terminals; 5G System; Technical Realization of Service Based Architecture; Stage 3 (Release 16); V16.9.0 (2021-09).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for using an application programming interface (API) exposure function (AEF) group, the method comprising:
   at a common application programming interface (API) framework (CAPIF) node including at least one processor:
      receiving an API exposure function (AEF) group creation message for creating an AEF group associated with an API invoker, wherein the AEF group creation message includes AEF group information indicating one or more service APIs usable by an API invoker;
      storing the AEF group information;
      determining, using the AEF group information, service API information associated with the AEF group for the API invoker; and
      providing the service API information to the API invoker.

2. The method of claim 1 wherein determining the service API information includes filtering or otherwise preventing unauthorized service API information from being sent to the API invoker.

3. The method of claim 1 wherein the AEF group creation message is from an administrator or a network operator.

4. The method of claim 1 wherein the AEF group creation message is provided offline; during initialization of the CAPIF node or an AEF; or prior to the CAPIF node being queried by the API invoker.

5. The method of claim 1 wherein the CAPIF node supports an AEF group update message for changing the AEF group and/or an AEF group deletion message for deleting the AEF group.

6. The method of claim 1 wherein the service API information is provided in an API discovery response or in an onboard API invoker response.

7. The method of claim 1 wherein the CAPIF node includes a CAPIF core function (CCF).

8. The method of claim 1 wherein the API invoker is an application function that is in a trust domain of the CAPIF node or is external to the trust domain of the CAPIF node.

9. The method of claim 1 wherein the AEF group creation message or the AEF group information indicates a group identifier, a list of one or more provider domains associated with the AEF group, a list of one or more AEFs associated with the AEF group, a list of the one or more service APIs associated with the AEF group, a time period for the AEF group to be active or used, an auto-onboard status parameter for indicating whether the API invoker can be auto-onboarded by the CAPIF node, and/or a performance or enforcement metric associated with the AEF group.

10. A system for using an application programming interface (API) exposure function (AEF) group, the system comprising:
    at least one processor;
    a memory; and
    a common application programming interface (API) framework (CAPIF) node including the at least one processor and the memory, the CAPIF node configured for:
       receiving an API exposure function (AEF) group creation message for creating an AEF group associated with an API invoker, wherein the AEF group creation message includes AEF group information indicating one or more service APIs usable by an API invoker;
       storing the AEF group information;
       determining, using the AEF group information, service API information associated with the AEF group for the API invoker; and
       providing the service API information to the API invoker.

11. The system of claim 10 wherein the CAPIF node is configured for filtering or otherwise preventing unauthorized service API information from being sent to the API invoker.

12. The system of claim 10 wherein the service API information includes a service API name, a service API type, a communication type, a description, serving area information, an AEF location, an IP address, a port number, a uniform resource identifier, a protocol, a version number, or a data format.

13. The system of claim 10 wherein the AEF group creation message is from an administrator or a network operator.

14. The system of claim 10 wherein the AEF group creation message is provided offline; during initialization of the CAPIF node or an AEF; or prior to the CAPIF node being queried by the API invoker.

15. The system of claim 10 wherein the CAPIF node supports an AEF group update message for changing the AEF group and/or an AEF group deletion message for deleting the AEF group.

16. The system of claim 10 wherein the service API information is provided in an API discovery response or in an onboard API invoker response.

17. The system of claim 10 wherein the CAPIF node includes a CAPIF core function (CCF).

18. The system of claim 10 wherein the API invoker is an application function that is in a trust domain of the CAPIF node or is external to the trust domain of the CAPIF node.

19. The system of claim 10 wherein the AEF group creation message or the AEF group information indicates a group identifier, a list of one or more provider domains associated with the AEF group, a list of one or more AEFs associated with the AEF group, a list of the one or more service APIs associated with the AEF group, a time period for the AEF group to be active or used, an auto-onboard status parameter for indicating whether the API invoker can be auto-onboarded by the CAPIF node, and/or a performance or enforcement metric associated with the AEF group.

20. A non-transitory computer readable medium having stored thereon executable instructions that when executed by at least one processor of a computer cause the computer to perform steps comprising:
- at a common application programming interface (API) framework (CAPIF) node including at least one processor:
- receiving an API exposure function (AEF) group creation message for creating an AEF group associated with an API invoker, wherein the AEF group creation message includes AEF group information indicating one or more service APIs usable by an API invoker;
- storing the AEF group information;
- determining, using the AEF group information, service API information associated with the AEF group for the API invoker; and
- providing the service API information to the API invoker.

* * * * *

UNITED STATES PATENT AND TRADEMARK OFFICE
CERTIFICATE OF CORRECTION

| | |
|---|---|
| PATENT NO. | : 11,785,102 B1 |
| APPLICATION NO. | : 17/828746 |
| DATED | : October 10, 2023 |
| INVENTOR(S) | : Boyapati et al. |

Page 1 of 1

It is certified that error appears in the above-identified patent and that said Letters Patent is hereby corrected as shown below:

In the Specification

In Column 2, Line 23, after ""function"" insert -- , --, therefor.

In Column 11, Line 26, delete "type." and insert -- type). --, therefor.

In Column 11, Line 35, delete "that that" and insert -- that --, therefor.

In Column 12, Line 11, delete "type." and insert -- type). --, therefor.

In Column 12, Line 20, delete "that that" and insert -- that --, therefor.

In Column 14, Line 31, delete "CAPIF-interface." and insert -- CAPIF-5 interface. --, therefor.

Signed and Sealed this
Twenty-fifth Day of June, 2024

Katherine Kelly Vidal
*Director of the United States Patent and Trademark Office*